United States Patent [19]
May et al.

[11] Patent Number: 5,497,712
[45] Date of Patent: Mar. 12, 1996

[54] LOW-TEMPERATURE CARBONIZATION/COMBUSTION PROCESS AND LOW-TEMPERATURE CARBONIZATION/COMBUSTION PLANT WITH PRESSURE CONTROL

[75] Inventors: Karl May, Bad-Vilbel; Hartmut Herm, Dreieich; Reinhard Mattke, Obertshausen, all of Germany

[73] Assignee: Siemens Aktiengesellschaft, Munich, Germany

[21] Appl. No.: 135,251

[22] Filed: Oct. 12, 1993

[30] Foreign Application Priority Data

Oct. 9, 1992 [DE] Germany .................. 42 34 163.9

[51] Int. Cl.$^6$ .................. C10B 53/02; F23G 5/027
[52] U.S. Cl. .................. 110/342; 48/111; 48/209; 110/345; 110/189; 110/216
[58] Field of Search .................. 110/215, 216, 110/189, 162, 342–345

[56] References Cited

U.S. PATENT DOCUMENTS

| | | | |
|---|---|---|---|
| 4,677,357 | 6/1987 | Spence et al. | 110/189 |
| 5,029,535 | 7/1991 | Krigmont et al. | 110/216 |
| 5,035,188 | 7/1991 | Johnson et al. | 110/216 |
| 5,255,616 | 10/1993 | Wintrich et al. | 110/216 |

FOREIGN PATENT DOCUMENTS

| | | |
|---|---|---|
| 0302310 | 7/1988 | European Pat. Off. . |
| 75-20958 | 1/1976 | France . |
| 37 33 078 | 4/1989 | Germany . |
| 3830153 | 3/1990 | Germany . |
| 3909696 | 9/1990 | Germany . |
| 3815187 | 3/1993 | Germany . |
| 88/01198 | 2/1988 | WIPO . |

OTHER PUBLICATIONS

Patent Abstract of Japan No. JP 2-52926 (Yoshiyuki Hanada), Feb. 22, 1990.

*Primary Examiner*—David A. Okonsky
*Attorney, Agent, or Firm*—Herbert L. Lerner; Laurence A. Greenberg

[57] ABSTRACT

A low-temperature carbonization/combustion process is carried out in a low-temperature carbonization/combustion plant with pressure control that includes a pyrolysis drum to which waste is delivered. Low-temperature carbonization gas generated there is passed to a combustion chamber. Flue gas produced there is fed through a cooling device and a gas compressor to a stack. With the aid of a control device, the speed of rotation of the gas compressor is controlled in relation to the pressure in the gas path between the pyrolysis drum and the gas compressor in such a way that when the pressure decreases, the speed of rotation is decreased. Preferably, an additional gas compressor is connected in series with the gas compressor and the speed of rotation of the additional gas compressor is appropriately controlled. An additional pyrolysis drum can also be provided.

23 Claims, 4 Drawing Sheets

| | $p_1$ [mbar abs] | $p_3$ [mbar abs] | $p_0-p_1$ [mbar] | $p_0-p_3$ [mbar] | $n_I$ [min$^{-1}$] |
|---|---|---|---|---|---|
| 1 | 996*) | 996*) | 4 | 4 | 1200 |
| 2 | 994 | 994.5*) | 6 | 5.5 | 1350 |
| 3 | 997*) | 996.5 | 3 | 3.5 | 1100 |

5,497,712

LOW-TEMPERATURE CARBONIZATION/COMBUSTION PROCESS AND LOW-TEMPERATURE CARBONIZATION/COMBUSTION PLANT WITH PRESSURE CONTROL

BACKGROUND OF THE INVENTION

FIELD OF THE INVENTION

The invention relates to a low-temperature carbonization/combustion process in which low-temperature carbonization gas generated by a pyrolysis drum is passed into a burner of a combustion chamber, flue gas formed there as a result of combustion is fed through a cooling device and through a gas compressor to an outlet, and pressure in a gas path between the pyrolysis drum and the gas compressor is influenced by the gas compressor. The invention further relates to a low-temperature carbonization/combustion plant which operates according to the process. The process and the plant are used for thermal waste disposal.

The so-called low-temperature carbonization/combustion process has become known in the waste disposal sector. The process and a plant for thermal waste disposal operating in accordance with it are described, for example, in Published European Application No. 0 302 310 A1, corresponding to U.S. Pat. No. 4,878,440, and in German Published, Non-Prosecuted Application DE 38 30 153 A1. The plant for thermal waste disposal according to the low-temperature carbonization/combustion process contains a pyrolysis reactor and a high-temperature combustion chamber as essential components. The pyrolysis reactor converts charged waste into low-temperature carbonization gas and pyrolysis residue. The low-temperature carbonization gas and the pyrolysis residue are then fed to the burner of the high-temperature combustion chamber after suitable treatment. Molten slag is formed in that case, which can be taken off through a discharge and which is present in vitrified form after cooling. The resulting flue gas is fed through a flue gas pipe to a stack as an outlet. A waste heat steam generator acting as a cooling device, a dust filter unit and a flue gas purification plant are preferably installed in the flue gas pipe. Furthermore, situated in the flue gas pipe is a gas compressor which can be disposed directly at the outlet of the flue gas purification plant and can be configured as an induced draught fan. The built-in gas compressor serves for maintaining a reduced, even if slight, pressure in the pyrolysis drum. The reduced pressure prevents low-temperature carbonization gas from escaping through ring seals of the pyrolysis drum to the outside and into the surroundings.

It has been shown that in a low-temperature carbonization/combustion plant, the gas compressor or the induced draught fan can hardly be allowed to run at constant speed of rotation, since as a consequence of varying gas production, a variable pressure in the gas path results between the pyrolysis drum and the gas compressor. Such an inconstant behavior of the gas pressure is undesirable, since in some circumstances, even if only for a short time, it could lead to overshooting or exceeding the ambient pressure and thus to the escape of flue gas, or else to a too intensely reduced pressure in the flue gas path.

SUMMARY OF THE INVENTION

It is accordingly an object of the invention to provide a low-temperature carbonization/combustion process and a low-temperature carbonization/combustion plant with pressure control, which overcome the hereinafore-mentioned disadvantages of the heretofore-known methods and devices of this general type and which permit control of the pressure even when the gas production in the low-temperature carbonization drum varies.

With the foregoing and other objects in view there is provided, in accordance with the invention, a low-temperature carbonization/combustion process, which comprises generating a low-temperature carbonization gas in a pyrolysis drum in a gas path; passing the low-temperature carbonization gas into a burner of a combustion chamber; feeding flue gas formed in the combustion chamber as a result of combustion through a cooling device and through a gas compressor to an outlet; influencing pressure in the gas path between the pyrolysis drum and the gas compressor with the gas compressor; and controlling or directing a speed of rotation of the gas compressor in relation to the pressure in the gas path, when the pressure in the gas path is lower than the ambient pressure, by decreasing the speed of rotation when the pressure decreases.

The invention is thus based on the consideration that at least in a pressure range in which the pressure in the gas path is lower than the ambient pressure, a large gas production in the low-temperature carbonization drum can be overcome by a high speed of rotation of the gas compressor, and on the other hand, a low gas production, which can go down to a zero quantity, can be overcome by a low speed of rotation of the gas compressor. If the pressure in the gas path should increase, for example as a consequence of excessive waste moisture and thus an excessively generated amount of low-temperature carbonization gas, above a pressure which lies above a maximum pressure or even above the ambient pressure, further measures can be provided which are described in more detail below.

In the simplest case, control can be achieved by directing the speed of rotation in relation to the pressure according to a preset relationship. This relationship can be preset in the form of a table or in the form of a diagram. In this case therefore, this is a pressure-dependent control of the speed of rotation.

In accordance with another mode of the invention, there is provided a pressure regulation through the speed of rotation. This development is distinguished in that the pressure in the gas path is kept at a set-point value which is lower than the ambient pressure.

In accordance with a further mode of the invention, there are provided further measures through which the pressure in the gas path is constantly kept beneath the ambient pressure.

In accordance with an added mode of the invention, in the control or regulation, care is taken to keep the pressure constantly beneath a maximum limit value which should lie somewhat beneath the ambient pressure. This can preferably be achieved by significantly increasing the speed of rotation of the gas compressor when a preset maximum value of the pressure in the gas path is reached. This leads to a time-dependent pressure/speed of rotation characteristic graph passing through a marked change or even a sharp fall from the maximum value of the pressure.

However, too low a pressure in the gas path can also be harmful. This is because the conventional components only withstand a certain reduced pressure, if particularly costly measures are not to be taken. In accordance with an additional mode of the invention, in order to also ensure a safeguard in this case, according to a further development it is provided that when a preset minimum value of the pressure in the gas path is reached, the speed of rotation of the gas compressor is significantly reduced or even set to zero.

A single gas compressor in the flue gas path is frequently not sufficient, either because the power rating is insufficient or because a certain redundancy and security against failure are intended to be present. In accordance with yet another mode of the invention, there is provided an additional gas compressor disposed parallel to, but preferably in series with, the gas compressor, and the speed of rotation of the additional gas compressor is controlled in relation to the pressure in the gas path in such a way that when the pressure decreases, the speed of rotation is decreased.

When operating this additional gas compressor a procedure analogous to the first-mentioned gas compressor is followed. In accordance with yet a further mode of the invention, the speed of rotation of the additional gas compressor can be controlled in an identical manner with respect to set-point value, ambient pressure, maximum value and/or minimum value, as the speed of rotation of the first-mentioned gas compressor.

Occasionally, there is also the necessity to provide an additional pyrolysis drum, for example because the production of waste or refuse is greater or because pyrolysis drums have passed through the required approval process only up to a certain capacity. In that case, in accordance with yet an added mode of the invention, the procedure is carried out in such a way that the low-temperature carbonization gas generated by the additional pyrolysis drum is delivered to the burner of the existing combustion chamber.

If two pyrolysis drums as well as two gas compressors are provided, a redundant control of speed of rotation is provided. In accordance with yet an additional mode of the invention, the speed of rotation of the gas compressor and, independently thereof, the speed of rotation of the additional gas compressor, are each controlled in relation to the pressure in the pyrolysis drum and the pressure in the additional pyrolysis drum.

The gas production in the two pyrolysis drums can differ quantitatively. For this reason, in accordance with again another mode of the invention, the higher of the two pressures in the pyrolysis drums in each case is selected to control or direct the speed of rotation. The higher pressure leads to a higher speed of rotation and this in turn to a more rapid decay of the pressure.

With the objects of the invention in view, there is also provided a low-temperature carbonization/combustion plant for thermal waste disposal, comprising a gas path including a pyrolysis drum generating low-temperature carbonization gas, a combustion chamber having a burner receiving the low-temperature carbonization gas and forming flue gas as a result of combustion, a cooling device for receiving the flue gas, a gas compressor for receiving the cooled flue gas and for adjusting pressure in the gas path between the pyrolysis drum and the gas compressor relative to the environment, and an outlet downstream of the gas compressor; and a control device for controlling or directing a speed of rotation of the gas compressor in relation to the pressure in the gas path, by decreasing the speed of rotation when the pressure decreases.

In accordance with another feature of the invention, the control device includes means for ensuring a preset relationship between the supplied measured value for the pressure and the manipulated variable for the speed of rotation. This preset relationship can be in the form of a table or a diagram and can be stored in the control device.

In accordance with a further feature of the invention, there is provided a regulator connected upstream of the control device to which a set-point value for the pressure in the gas path is transmitted, in addition to the measured pressure value being determined. This regulating circuit ensures that the pressure in the gas path is kept to the set-point value, at least in the long term.

It has already been explained above that it is advantageous to keep the pressure in the gas path constantly beneath a maximum limiting value, which should at the most be equal to the ambient pressure. In order to put this into effect, in accordance with an added feature of the invention, there is provided a comparator which compares a determined measured value for the pressure in the gas path with a preset maximum value and, when the maximum value is exceeded, delivers an additional signal to the control device in such a way that the speed of rotation of the gas compressor is significantly increased. In this manner, a behavior is produced having a sharply falling or curving control characteristic graph.

An analogous procedure can be followed if undershooting a minimum limiting value for the pressure in the gas path is to be prevented. Therefore, in accordance with again an additional feature of the invention, there is provided a comparison element which compares a determined measured value for the pressure in the gas path with a preset minimum value and which, when the minimum value is undershot or not reached, delivers an additional input signal to the control device in such a manner that the speed of rotation of the gas compressor is significantly decreased or set to zero.

As already described above, it is of practical importance if an additional gas compressor is disposed in the gas path. This can be disposed in parallel, but preferably in series, relative to the gas compressor that was already mentioned. In this case, in accordance with again another feature of the invention, there is provided an additional control device which controls or directs the speed of rotation of the additional gas compressor, independently of the speed of rotation of the first-mentioned gas compressor, likewise in relation to the pressure in the gas path, in such a way that when the pressure decreases, the speed of rotation of the additional gas compressor is decreased.

With regard to this additional control device, a procedure should be followed as was described above for the first-mentioned control device. Therefore, in accordance with again a further feature of the invention, the same components are connected upstream of the additional control device as of the first-mentioned control device.

As was already explained, for capacity or approval reasons, an additional pyrolysis drum can be provided. This is preferably connected to the burner of the combustion chamber that is present in any case, so that the two pyrolysis drums operate in parallel.

In accordance with again an added feature of the invention, in order to effect the control of the speed of rotation or regulation of the speed of rotation, for pressure measurement, there is provided at least one pressure gauge in each of the two pyrolysis drums, that is preferably at each of the exhaust casings.

In accordance with again an additional feature of the invention, the control device and the additional control device are each connected on the input side to a first and a second pressure gauge, with the first pressure gauge measuring the pressure in the pyrolysis drum and the second pressure gauge measuring the pressure in the additional pyrolysis drum.

In accordance with still another feature of the invention, the control device and the additional control device each contain a discriminator which transmits the higher pressure value for controlling or directing the relevant speed of rotation.

In accordance with a concomitant feature of the invention, there is provided a flue gas purification plant, in particular a $DeNO_x$ purifier, connected between the gas compressor and the additional gas compressor.

At this point it should once again be noted that the above-described control or direction of the speed of rotation by control or regulation is suitable for a low-temperature carbonization/combustion plant including:

1. a single pyrolysis drum having two gas compressors connected in series,
2. two pyrolysis drums, operating in parallel at one combustion chamber, having two gas compressors connected in series,
3. two pyrolysis drums, operating in parallel at one combustion chamber, having two gas compressors connected in parallel in the gas path, and
4. a single pyrolysis drum having two gas compressors disposed in the gas path and parallel to each other.

Other features which are considered as characteristic for the invention are set forth in the appended claims.

Although the invention is illustrated and described herein as embodied in a low-temperature carbonization/combustion process and a low-temperature carbonization/combustion plant with pressure control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a view similar to FIG. 2 of a further low-temperature carbonization/combustion plant in which a maximum limiting value is adhered to;

DESCRIPTION OF THE PREFERRED EMBODIMENTS

Figure 1:
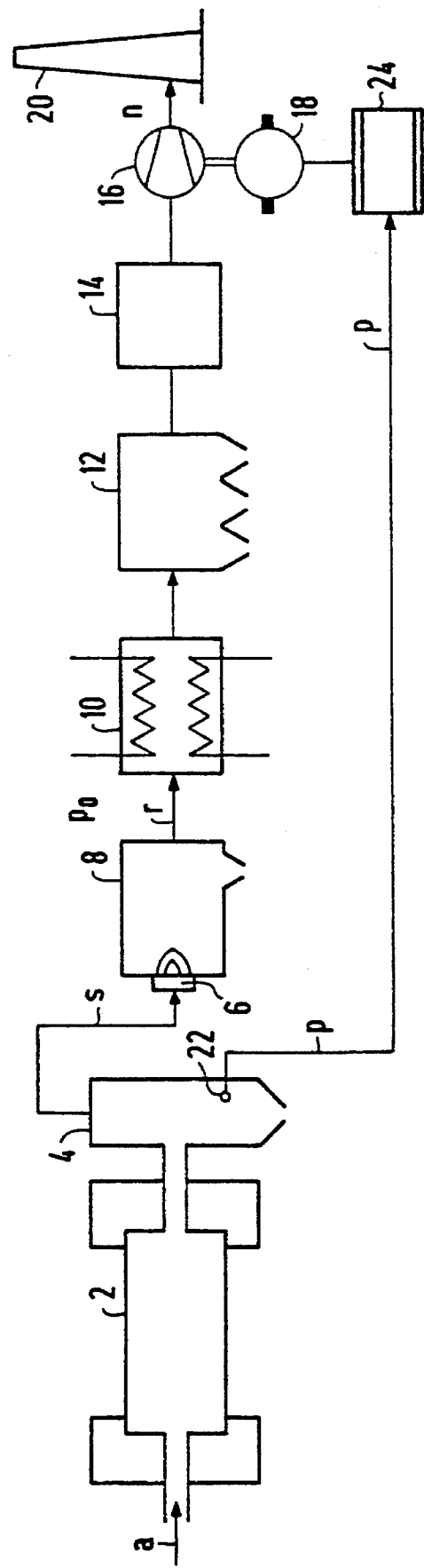
FIG. 1 is a schematic circuit diagram of a low-temperature carbonization/combustion plant for thermal waste disposal, in which a speed of rotation of a fan is controlled or directed in relation to pressure in a pyrolysis drum.

Referring now to the figures of the drawing in detail and first, particularly, to FIG. 1 thereof, there is seen a low-temperature carbonization/combustion plant which includes a low-temperature carbonization or pyrolysis drum 2, to which waste a is supplied. The pyrolysis drum 2 produces low-temperature carbonization gas s, which is passed from an exhaust casing 4 thereof to a burner 6 of a high-temperature combustion chamber 8 having a slag take-off. Flue gas r that is formed there as a consequence of combustion is passed through a cooling device 10, which in the present case is a waste heat boiler, to a flue gas purification device 12. In this case, the device 12 can preferably be a wet flue gas purification plant having a dust filter unit. The purified flue gas is then delivered to a $DeNO_x$ device 14, where it is substantially freed of nitrogen oxides. In order to transport the flue gas r, a fan or gas compressor 16 which is driven by an electric motor 18, is provided at an outlet of the $DeNO_x$ device 14. The flue gas line then leads to an outlet in the form of a stack 20.

It is then of importance that a pressure p in a gas path between the pyrolysis drum 2 and the gas compressor 16 is influenced by the gas compressor 16. This influence is carried out in the form of a control according to a preset characteristic graph $n=f(p)$ as is illustrated, for example, in FIG. 6. A procedure is preferably followed in such a way that a speed of rotation n of the gas compressor 16 is controlled or directed in relation to the pressure p in the gas path between the pyrolysis drum 2 and the gas compressor 16 in such a manner that when the pressure p decreases, the speed of rotation n is decreased. For this purpose, the pressure p is measured with the aid of a pressure sensor or pressure gauge 22 in the pyrolysis drum 2, and preferably in its exhaust casing 4. The measured pressure value p is passed to a control device 24 which is provided as an actuator for activating an electric motor 18. In the control device 24 means, for example a memory which stores the preset relationship $n=f(p)$, are present. This type of direction or control of the speed of rotation n is provided in the case of a pressure p in the gas path which is lower than a pressure $P_o$ in the surroundings. If the pressure p approaches this ambient pressure $P_o$ this type of direction or control of the speed of rotation can be relieved by another type of control or a safety measure.

Figure 2:
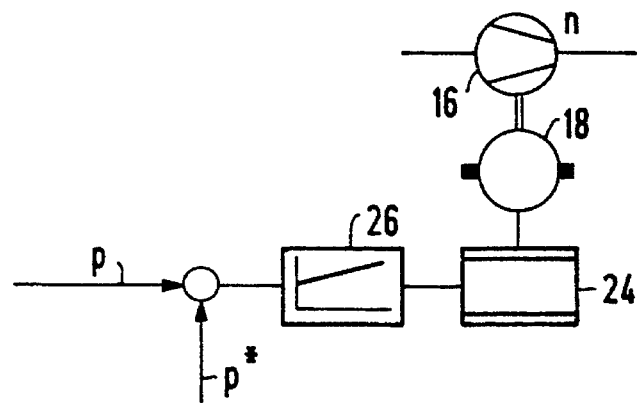
FIG. 2 is a portion of a circuit diagram of a low-temperature carbonization/combustion plant, in which regulation of the speed of rotation is used.

In FIG. 2 it is shown that the control of the speed of rotation can be expanded to a regulation of the speed of rotation. For this purpose, a regulator 26 is connected upstream of the control device 24. The actual pressure value p and a setpoint pressure value p* are transmitted to the regulator 26 for the purpose of comparison. Through the use of such a regulation, the pressure p in the gas path can be kept to the set-point value p*, with this set-point value p* being lower than the ambient pressure $p_o$.

Figure 3:
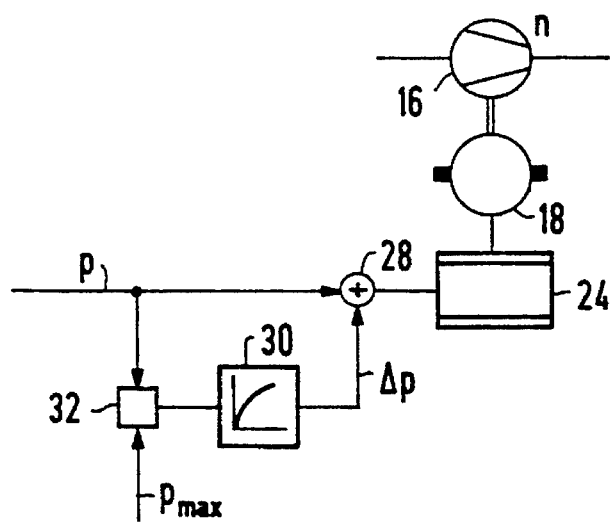

FIG. 3 illustrates a variation of the circuit of FIG. 1 which ensures that the pressure p in the gas path is constantly kept beneath a maximum limiting value $p_{max}$. For this purpose, transmission of a correction value $\Delta p$ is provided, in order to ensure that at an elevated pressure p, the speed of rotation is significantly increased and thus the suction is intensified. For this purpose, the actual value of the pressure p and the additional signal $\Delta p$ are fed to an addition element 28 which is assigned to the control device 24. The correction value or additional signal $\Delta p$ is taken from a function generator 30 which is connected downstream of a comparator 32. The comparator 32 compares the measured value p for the pressure in the gas path with the preset maximum value $p_{max}$. When this maximum value $p_{max}$ is exceeded, the comparator transmits the additional signal $\Delta p$ to the control device 24. With the aid of the function generator 30, this is performed in such a manner that the speed of rotation n of the gas compressor 16 is significantly increased. The effect of this is that as a result of the transmission, in FIG. 6, the continuous course 34 of the graph does not apply but rather a dashed course 36 of the graph applies.

Figure 4:
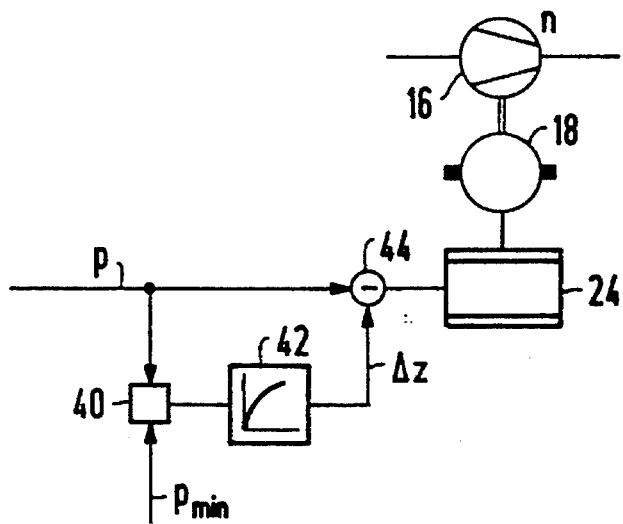
FIG. 4 is another view similar to FIGS. 2 and 3 of another low-temperature carbonization/combustion plant in which protection from undershooting a minimum limiting value of the pressure is provided.

In FIG. 4 an embodiment is shown in which it is ensured that when a minimum value $p_{min}$ of the pressure is undershot, an emergency measure is taken of such a type that the speed of rotation n of the gas compressor 16 is greatly reduced or even set to zero, in order to make a pressure rise possible. For this purpose, a comparison element 40 is provided which compares the measured value p for the pressure in the gas path with the preset minimum value. When the minimum value is undershot, the comparator element activates a function generator 42, which delivers an input signal $\Delta z$, in addition to the pressure signal p, to a subtraction unit 44, which is assigned to the control device 24. This is performed in such a manner that the speed of rotation n of the gas compressor 16 is significantly decreased or even set to zero, as was mentioned previously.

Figure 5:
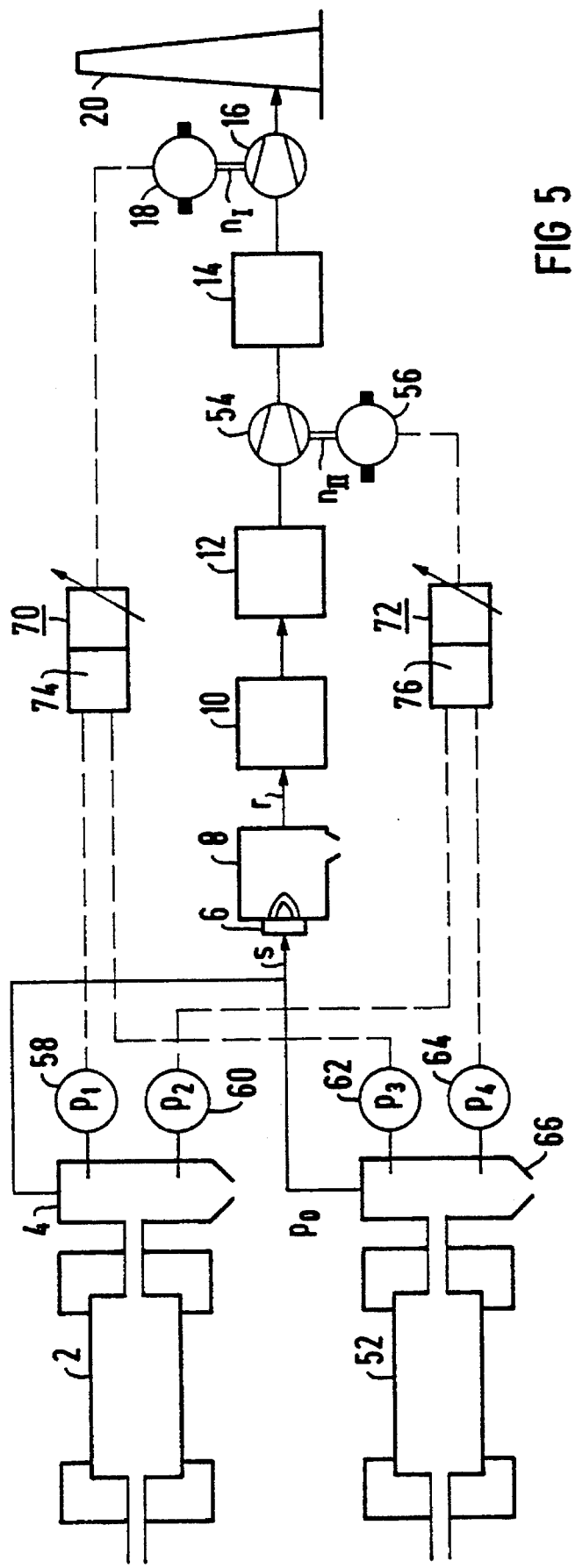
FIG. 5 is a view similar to FIG. 1 of a preferred low-temperature carbonization/combustion plant having two pyrolysis drums and two gas compressors connected in series.

In a low-temperature carbonization/combustion plant according to FIG. 5, the principle of the circuit configuration shown in FIG. 1 can initially be recognized. In addition to the pyrolysis drum 2, an additional pyrolysis or low-temperature carbonization drum 52 is provided in this case, which has a low-temperature carbonization gas line that is likewise connected to the burner 6 of the combustion chamber 8. With the aid of these two pyrolysis drums 2, 52 it is ensured that a large amount of waste can be thermally treated. It is furthermore notable in comparison to the configuration according to FIG. 1 that in the present case an additional gas compressor 54 having a drive motor 56, is disposed between the flue gas purification device 12 and the $DeNO_x$ device 14. The two gas compressors 16, 54 are therefore connected together in series. Through the use of the configuration of the two fans or gas compressors 16, 56, a redundancy is ensured. This occurs in such a way that, if one of the two gas compressors 16, 54 fails, it is ensured that the low-temperature carbonization gas s is nevertheless extracted from the two pyrolysis drums 2, 52 by suction and is introduced into the combustion chamber 8. Without the suction by at least one gas compressor 16, 54, the unburned gas s, which continues to be supplied, would effect a pressure rise in the pyrolysis drum 2, 52. As a result, damage in the form of a leak could occur, and the low-temperature carbonization gas s could escape into the surroundings in an uncontrolled manner in an unburnt form, which must be absolutely prevented.

In order to provide pressure measurement, in each of the two pyrolysis drums 2, 52, two pressure gauges 58, 60 and 62, 64 are respectively provided. The pressure gauges 58, 60 are disposed at the exhaust casing 4 and the pressure gauges 62, 64 are disposed at an exhaust casing 66. They could alternatively be mounted in the low-temperature carbonization gas line.

In order to provide control of a speed of rotation $n_I$ of the gas compressor or first fan 16 and of a speed of rotation $n_{II}$ of the additional gas compressor or second fan 54, two control devices 70 and 72 are respectively provided. The control device 70 is connected on the input side to the pressure gauge 58 on the pyrolysis drum 2 and to the pressure gauge drum 62 on the pyrolysis drum 52. Correspondingly, the additional control device 72 is connected on the input side to the pressure gauge 60 on the first pyrolysis drum 2 and to the pressure gauge 64 on the additional pyrolysis drum 52. Each of the two control devices 70, 72 contains a respective discriminator 74, 76 which passes on the particular higher pressure value existing for controlling the relevant speed of rotation $n_I$ or $n_{II}$.

The two pyrolysis drums 2, 52 generate low-temperature carbonization gas s in operation. In the case of breakdowns in the plant, the gas production cannot be spontaneously interrupted. It has been shown that after shut-off, low-temperature carbonization gas s is still produced in an uncontrollable manner for approximately 0.5 to 1 hour. The two gas compressors 16, 54, in normal operation as well as in operation during a breakdown, remove the low-temperature carbonization gas s by suction from the pyrolysis drums 2, 52, that is through the combustion chamber 8, the cooling device 10 in the form of the waste heat boiler, the flue gas purification device 12 and the $DeNO_x$ device 14 and transport the resulting flue gas r to the stack 20.

In the normal case, the two gas compressors 16, 56 run at the same speed of rotation $n_I=n_{II}$. In fault-free operation the two pressure gauges 58, 60 indicate the same pressure value $p_1=p_2$. Likewise, the two pressure gauges 62, 64 indicate the same pressure value $p_3=p_4$. The operation in this case is again also planned in such a way that in the case of high gas production and thus a high pressure $p_1$ to $p_4$ in the pyrolysis drums 2, 52, a high speed of rotation $n_I$, $n_{II}$ established, whereas at a low gas production a low speed of rotation $n_I$, $n_{II}$ is established.

The illustrated plant is insensitive in particular to a conceivable breakdown which can be described by the expressions "low gas production" and "high speed of rotation". A low gas production can occur in the case of a low delivery of waste a, and too high a speed of rotation $n_I$ or $n_{II}$ can result in the event of a breakdown in the registering of the measured value, that is in one of the pressure gauges 58 to 64, or in the event of a breakdown of the measured value processing in one of the control devices 70, 72. The consequence of such a fault is the following: as a result of the high speed of rotation, without the countermeasures taken herein, and with a low gas flow rate, a high suction pressure or reduced pressure is produced on the gas path from the pyrolysis drums 2, 52 to the gas compressors 16, 54. The components situated therein, such as the flue gas purification vessel 12, an electrostatic precipitator, the waste heat boiler 10, are not constructed for this reduced pressure and can be destroyed by implosion.

The illustrated circuit configuration is thus safe with respect to faults of that type, so that no low-temperature carbonization or flue gas s, r can escape to the outside.

This safety with respect to failure comes about in the following manner: the reference variable for the speed of rotation $n_I$, $n_{II}$ of the two gas compressors 16, 54 is the pressure $p_1$, $p_3$ and $p_2$, $p_4$ in the residue and low-temperature carbonization gas exhaust housing of each pyrolysis drum 2, 52.

As was mentioned above, in order to achieve this, one pressure sensor or recorder each 58, 62 and 60, 64 is disposed for each fan 16, 54 on the two pyrolysis drums 2, 52. In the two control devices 70, 72, the higher of the two absolute pressure values that are present is always the reference variable for setting the speed of rotation $n_I$ or $n_{II}$. The control is performed, for example, by regulation according to FIG. 6, with a curve 34 or 36. In the case of the pressure exceeding the set-point value p* (for example p*=998 mbar), an increase in the speed of rotation is therefore carried out until the set-point value p* is achieved again. In the case of pressure being reduced with respect to the set-point value p*, on the other hand, a reduction in the speed of rotation is carried out until the set-point value p* is achieved again. Even if one of the pyrolysis drums 2, 52 is at a standstill, both fans 16, 54 are operated.

The case of a fault will be considered below. It will be assumed that the pressure gauge 58 or the control device 70 fails as a result of the fault, that is in such a manner that the gas compressor 16 operates at the maximum speed of rotation. A very low pressure p is then generated in the gas path. That is, a strong suction pressure or reduced pressure is formed. The three pressure gauges 60, 62 and 64 immediately register the pressure drop. However, the pressure gauge 62 has no effect on the faulty behavior of the gas compressor 16. As a consequence of the pressure drop being registered, the pressure gauges 60, 64 which indicate the higher absolute pressure, control the speed of rotation $n_{II}$ of the second gas compressor 54 downwards. As a result, less gas is transported so that the pressure p is maintained, or is even increased. As a result it is ensured that the pressure p in the flue gas pipe does not undershoot a permissible minimum pressure.

Using the indicated control of the two gas compressors 16, 54, the same fault can also be overcome in the case of a shutdown, for example during repair to one pyrolysis drum 2, 52.

It can therefore be established that it is not necessary using the above-mentioned technique to undertake an extremely costly construction of the large-scale components for the lowest suction pressure of the two gas compressors 16, 54.

Figures 6, 7:
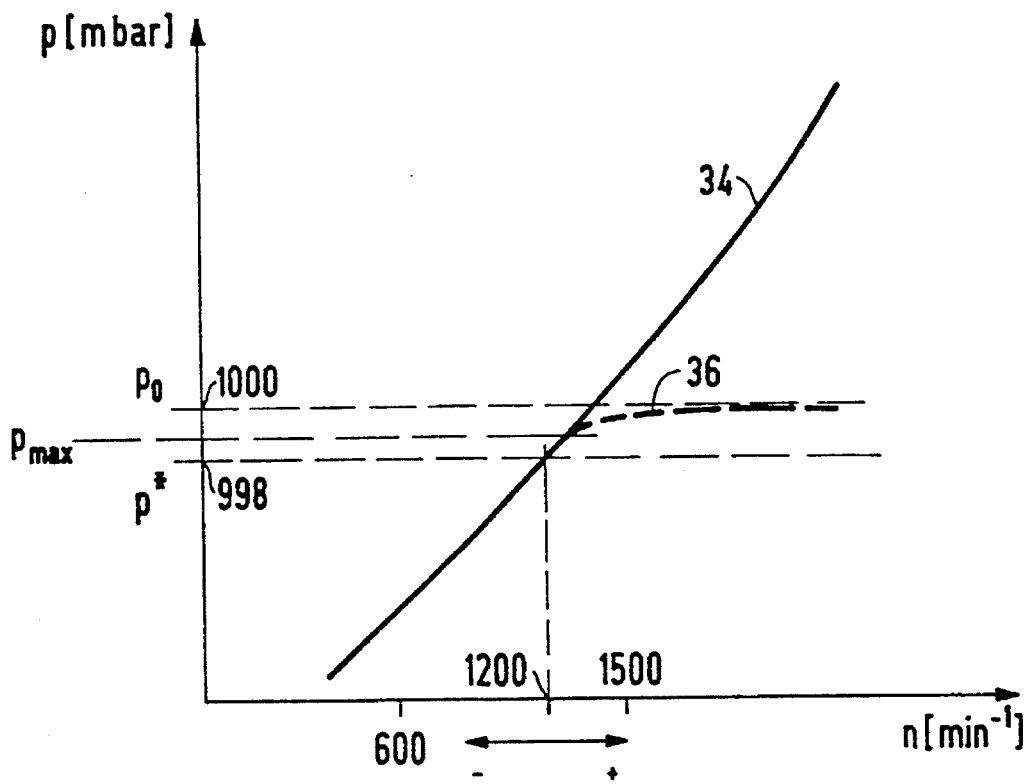
FIG. 6 is a diagram in which the pressure in the respective pyrolysis drum is applied through the speed of rotation of a fan.
FIG. 7 is a table with examples of values for the low-temperature carbonization/combustion plant illustrated in FIG. 5.

FIG. 7 shows once more with reference to a table how, and under the influence of which pressures, the speed of rotation $n_I$ of the gas compressor 16 is set. A case 1 starts from the assumption that the two pressures $p_1$ and $p_3$ are equal and are, for example, 996 millibars. This leads to a speed of rotation of, for example, $n_I=1200$ rpm. A case 2 starts from the assumption that both pressures $p_1$, $p_3$ have dropped. In this case, the higher pressure of, for example, $p_3=994.5$ millibars, which is indicated by an asterisk, determines the speed of rotation of, for example, $n_I=1350$ rpm. Finally, in a case 3, both pressures $p_1$, $p_3$ have increased, with the pressure $p_1$ of, for example, $p_1=997$ millibars then being the higher. This time, it determines the speed of rotation of, for example, $n_I=1100$ rpm, which is likewise indicated by an asterisk.

We claim:

1. A low-temperature carbonization/combustion process in a system comprising a pyrolysis drum, a combustion chamber, a cooling device, and a gas compressor connected in a gas path, the process which comprises:

generating a low-temperature carbonization gas in the pyrolysis drum in the gas path;

passing the low-temperature carbonization gas into the burner of the combustion chamber;

feeding flue gas formed in the combustion chamber as a result of combustion through the cooling device and through the gas chamber to an outlet;

influencing pressure in the gas path between the pyrolysis drum and the gas compressor with the gas compressor; and controlling a speed of rotation of the gas compressor in relation to the pressure in the gas path, by increasing the speed of rotation of the gas compressor when the pressure in the gas path reaches a preset maximum value somewhat below ambient pressure and by decreasing the speed of rotation of the gas compressor when the pressure in the gas path reaches a preset minimum value somewhat above a given critical pressure which components of the system cannot withstand.

2. The low-temperature carbonization/combustion process according to claim 1, which comprises controlling a speed of rotation of an additional gas compressor connected to the first-mentioned gas compressor, in relation to the pressure in the gas path, by decreasing the speed of rotation when the pressure decreases.

3. The low-temperature carbonization/combustion process according to claim 1, which comprises controlling a speed of rotation of an additional gas compressor connected to the first-mentioned gas compressor, in relation to the pressure in the gas path, by decreasing the speed of rotation when the pressure decreases, in the same manner as the speed of rotation of the first-mentioned gas compressor with respect to a set-point value.

4. The low-temperature carbonization/combustion process according to claim 1, which comprises controlling a speed of rotation of an additional gas compressor connected to the first-mentioned gas compressor, in relation to the pressure in the gas path, by decreasing the speed of rotation when the pressure decreases, in the same manner as the speed of rotation of the first-mentioned gas compressor with respect to an ambient pressure.

5. The low-temperature carbonization/combustion process according to claim 1, which comprises controlling a speed of rotation of an additional gas compressor connected to the first-mentioned gas compressor, in relation to the pressure in the gas path, by decreasing the speed of rotation when the pressure decreases, in the same manner as the speed of rotation of the first-mentioned gas compressor with respect to a maximum value.

6. The low-temperature carbonization/combustion process according to claim 1, which comprises controlling a speed of rotation of an additional gas compressor connected to the first-mentioned gas compressor, in relation to the pressure in the gas path, by decreasing the speed of rotation when the pressure decreases, in the same manner as the speed of rotation of the first-mentioned gas compressor with respect to a minimum value.

7. The low-temperature carbonization/combustion process according to claim 1, which comprises delivering low-temperature carbonization gas generated by an additional pyrolysis drum to the burner of the combustion chamber.

8. The low-temperature carbonization/combustion process according to claim 7, which comprises independently controlling the speed of rotation of the first-mentioned gas compressor and a speed of rotation of an additional gas compressor disposed in the gas path, in relation to the pressure in the first-mentioned pyrolysis drum and the pressure in the additional pyrolysis drum.

9. The low-temperature carbonization/combustion process according to claim 8, which comprises selecting the higher of the two pressures to control the speed of rotation.

10. A low-temperature carbonization/combustion plant for thermal waste disposal, comprising:

a gas path including:
a pyrolysis drum generating low-temperature carbonization gas,
a combustion chamber having a burner receiving the low-temperature carbonization gas and forming flue gas as a result of combustion,
a cooling device for receiving the flue gas,
a pressure sensor connected in said gas path for sensing a pressure in said gas path,
a gas compressor for receiving the cooled flue gas and for adjusting pressure in said gas path between said pyrolysis drum and said gas compressor relative to the environment, and
an outlet downstream of said gas compressor; and a control device for controlling a speed of rotation of said gas compressor in relation to the pressure in said gas path, said control device having means connected to said pressure sensor in said gas path for increasing the speed of rotation of the gas compressor when the pressure in the gas path reaches a preset maximum value somewhat below ambient pressure and for decreasing the speed of rotation of the gas compressor when the pressure in the gas path reaches a preset minimum value somewhat above a given critical pressure which the components cannot withstand.

11. The plant according to claim 10, wherein said control device includes means for ensuring a preset relationship between a supplied measured value for the pressure and a manipulated variable for the speed of rotation.

12. The plant according to claim 10, including a regulator connected upstream of said control device for receiving a determined measured value and a set-point value for the pressure in said gas path.

13. The plant according to claim 10, including a comparator comparing a determined measured value for the pressure in said gas path with a preset maximum value and delivering an additional signal to said control device when the maximum value is exceeded, for significantly increasing the speed of rotation of said gas compressor.

14. The plant according to claim 10, including a comparison element comparing a determined measured value for the pressure in said gas path with a preset minimum value and delivering an additional input signal to said control device when the minimum value is undershot, for at least significantly decreasing the speed of rotation of said gas compressor.

15. The plant according to claim 10, including an additional gas compressor being disposed in said gas path and connected to said first-mentioned gas compressor, and an additional control device controlling a speed of rotation of said additional gas compressor independently of the speed of rotation of said first-mentioned gas compressor in relation to the pressure in said gas path, for decreasing the speed of rotation of said additional gas compressor when the pressure decreases.

16. The plant according to claim 15, including components being connected upstream of said additional control device and of said first-mentioned control device.

17. The plant according to claim 10, including an additional pyrolysis drum connected to said burner of said combustion chamber.

18. The plant according to claim 17, including at least one pressure gauge for pressure measurement being disposed in each of said pyrolysis drums.

19. The plant according to claim 18, wherein said pyrolysis drums have exhaust casings at which said pressure gauges are disposed.

20. The plant according to claim 17, wherein said control devices have input sides, and including first and second pressure gauges connected to the input side of one of said control devices and first and second pressure gauges connected to the input side of the other of said control devices, said first pressure gauges measuring the pressure in said first-mentioned pyrolysis drum and said second pressure gauges measuring the pressure in said additional pyrolysis drum.

21. The plant according to claim 20, wherein each of said control devices have a respective discriminator transmitting the higher pressure value for controlling the relevant speed of rotation.

22. The plant according to claim 20, including a flue gas purification plant connected between said first-mentioned gas compressor and said additional gas compressor.

23. The plant according to claim 22, wherein said flue gas purification plant is a $DeNO_x$ purifier.

* * * * *